US006273302B1

(12) United States Patent
Fornaro

(10) Patent No.: US 6,273,302 B1
(45) Date of Patent: Aug. 14, 2001

(54) MOTORIZED TOOL FOR EXTRUDING SEMI-DENSE MATERIALS SUCH AS SEALANTS AND SIMILAR SUBSTANCES

(75) Inventor: Carlo Fornaro, Rosta (IT)

(73) Assignee: B.X.T. Trading Marketing E Consultores LDA, Franca (PT)

(*) Notice: Subject to any disclaimer, the term of this patent is extended or adjusted under 35 U.S.C. 154(b) by 0 days.

(21) Appl. No.: 09/548,622

(22) Filed: Apr. 13, 2000

(30) Foreign Application Priority Data

Apr. 13, 1999 (IT) ........................................ TO99A0284

(51) Int. Cl.[7] ................................................ G01F 11/42
(52) U.S. Cl. ........................................................ 222/333
(58) Field of Search ................................ 222/326, 327, 222/333, 390, 391; 604/154, 155; 200/522, 332.2

(56) References Cited

U.S. PATENT DOCUMENTS 3,309,484 * 3/1967 Frenzel ................................ 200/522
3,603,757 * 9/1971 Sahrbacker ........................... 200/522
3,711,666 * 1/1973 Sahrbacker ........................... 200/522
3,854,629 * 12/1974 Blieberger ............................ 222/333

* cited by examiner

*Primary Examiner*—Kevin Shaver
*Assistant Examiner*—Thach H Bui
(74) *Attorney, Agent, or Firm*—Sughrue, Mion, Zinn, Macpeak & Seas, PLLC

(57) ABSTRACT

Motorized tool for extruding or sucking in semi-dense materials, such as sealants and similar substances includes a body in pistol form containing a screw and nut system driven by a reversible electric motor to move a piston. The electric motor is controlled by a trigger switch connected to an electronic variator for controlling the motor rotation speed and an adjustable stop device is provided to select the length of the backward stroke of the trigger switch and therefore the rotation speed of the motor. Furthermore, a switch for selecting the rotation direction of the motor, consisting of the button of a microswitch, is located in front of the trigger.

1 Claim, 1 Drawing Sheet

1
2
3
4
5
6
7
8
9
10
11
12
13
14
15
16
17
18
19
20
21
22
23
24

MOTORIZED TOOL FOR EXTRUDING SEMI-DENSE MATERIALS SUCH AS SEALANTS AND SIMILAR SUBSTANCES

BACKGROUND OF THE INVENTION

This invention relates to motorized tools for extruding semi-dense materials such as sealants and similar materials.

In particular, the invention concerns such a motorized tool comprising a body in pistol form containing a screw and nut system driven by means of an electric motor to move a piston borne at one end of the screw, in which said motor is of the reversible type and is controlled by means of a trigger switch which can be pulled back to actuate the motor and in front of which is a switch for selecting the rotation direction of the motor.

Tools of this type are known: for example, German patent DE-C-3842767, European patent application EP-A0463990, U.S. Pat. No. 5,027,984 and, in particular, Italian application for registered utility model no. TO93U000049 in the name of Stefor Srl, assigned to the Applicant. In the motorized tool described in that document, which envisages a friction clutch device for releasing the screw of the actuating unit to rotate freely if the resistance to the movement of the piston is of a greater magnitude than a predetermined value, the selector switch governing the direction of rotation of the motor consists of a lever pointed towards either side of the tool to switch the rotation direction of the motor so as to correspond either to the forward or to the reverse movements of the screw with the piston.

This solution, while being relatively simple and effective, can lead to jamming and therefore to delays, particularly as far as the reverse movement of the piston at the end of the extrusion operation is concerned, with the consequence that it causes further undesired quantities of sealant or similar substance to come out of the tool.

A further problem with known motorized tools resides in the difficulty in setting the speed of flow of the sealant or similar substance from the tool with precision and its adjustment is entrusted to the sensitivity of the operator.

SUMMARY OF THE INVENTION

The object of this invention is to overcome these problems.

According to the invention, this object is achieved by the fact that, in a motorized tool of the type defined at the beginning, the abovementioned selector switch consists of the button of a microswitch which can be advanced to switch over the rotation direction of the motor alternatively, and the fact that connected to said trigger switch are an electronic variator for controlling the rotation speed of the motor, which depends on the length of the backward stroke of the trigger switch, and an adjustable stop device to select said length of the backward stroke of said trigger switch.

According to a particularly simple, economical and functional preferred embodiment of the invention, the adjustable stop is of mechanical type and is actuated manually. Furthermore, this adjustable stop can be advantageously set in an extreme position where it locks the trigger switch in the forward position.

BRIEF DESCRIPTION OF THE DRAWINGS

The invention will now be described in detail with reference to the attached drawings, provided by way of non-restrictive example, in which.

DETAILED DESCRIPTION OF THE INVENTION

Figures 1, 2:
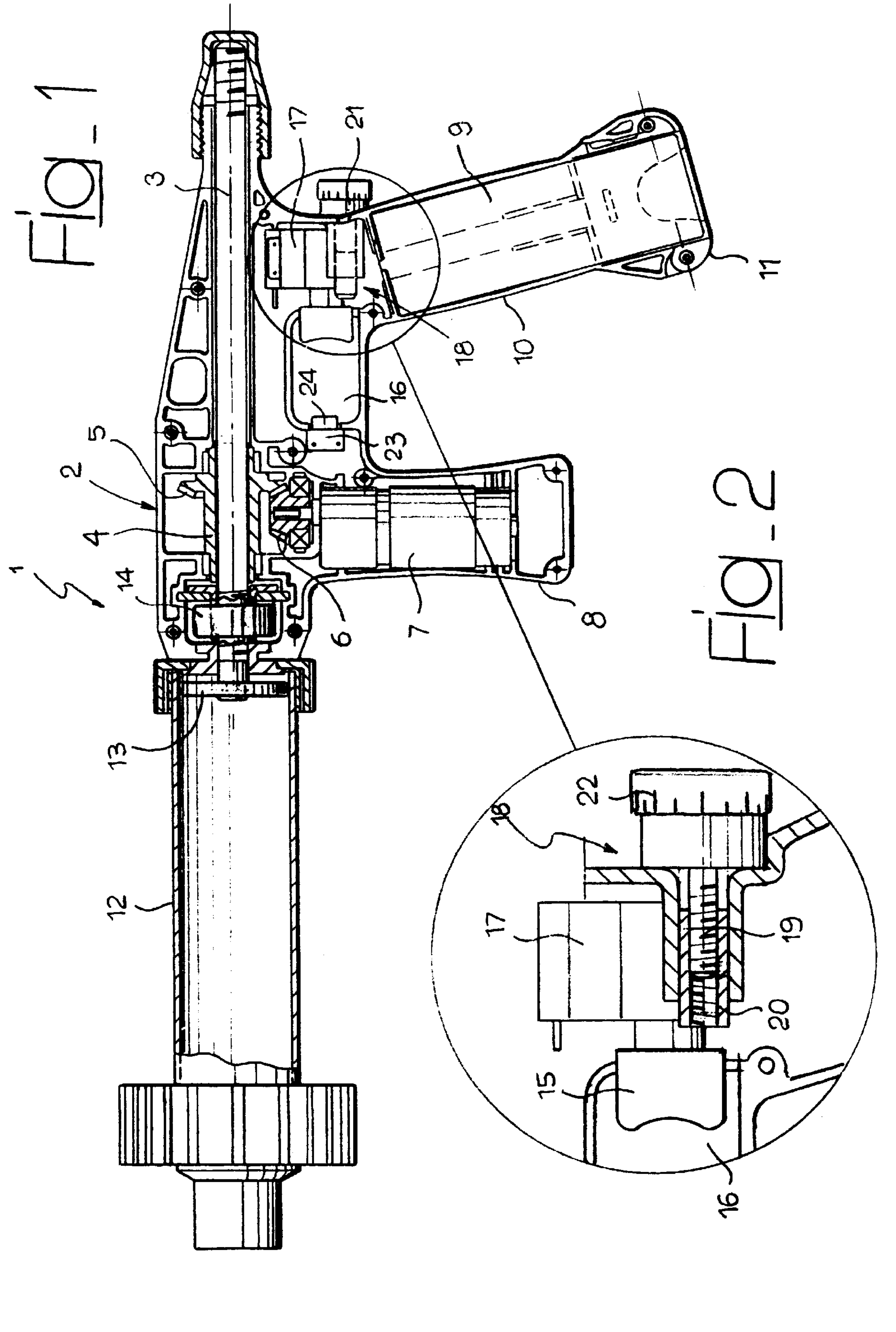
FIG. 1 is a schematic view in side elevation and partly in section of a motorized tool according to the invention.
FIG. 2 shows the detail marked in FIG. 1 partly in section and on a greater scale.

In the drawings, 1 indicates a motorized tool according to the invention in its entirety, comprising a body 2 consisting of two half-shells in a moulded plastic material and with the general form of a pistol.

A threaded rod 3, expediently with a triple-start thread, is housed movably in the body 2 and screws into a hollow nut 4 supported in the body 2 in a rotatable but not translatable manner.

The nut 4 is formed with a bevel ring gear 5 engaged with a bevel pinion 6 turned by a reversible direct current electric motor 7 inserted into a hollow protuberance 8 beneath the body 2 which acts as a secondary grip.

The electric motor 7 is powered by a rechargeable battery 9 housed in a hollow protuberance 10 beneath the body 2 situated behind the protuberance 8 and acting as the main grip. The grip 10 has a cover 11 at the bottom for the removal of the battery 9.

The number 12 indicates a tubular cylindrical element fitted in a removable manner to the front end of the body 2, coaxially with the screw 3. The cylindrical element 12, which can be connected to the body 2 in an angularly adjustable manner, can either house a container of sealant or similar substances in the form of a cartridge or flexible bag, or act as a reservoir for accumulating filler and similar material drawn in directly from the outside for subsequent extrusion.

There is a piston 13 connected to the front end of the threaded rod 3, conveniently in such a way that it can be quickly removed and replaced, inside the hollow cylindrical element 12.

For the threaded rod 3 to be able to move backwards or forwards as an effect of the rotation of the nut 4, it is necessary to prevent it from rotating with respect to the body 2. In the case of the example illustrated, and in accordance with the abovementioned Italian application for utility model no. TO93U000049, this non-rotatability can be created by means of a friction clutch device 14 suitable for releasing the threaded rod 3 to rotate in the event of a resistance to the travel of the piston 13 which is greater than a predetermined value, resulting, for example, from an obstruction in the flow of extruded material or to the entry of material being drawn in.

The operation of the motor 7 to provide the forward or reverse movement of the threaded rod 3, and therefore of the piston 13, is controlled by means of a trigger switch 15 protruding into an opening 16 of the body 2 located between the main grip 10 and the secondary grip 8. The trigger switch can be pulled back as an effect of the pressure exerted by the user's finger inserted through the opening 16, and is connected to an electronic variator 17 (of a conventional type) through which the motor rotation speed, and therefore the speed of extrusion of the material by the tool, can be varied on the basis of the length of the backward stroke of the trigger 15.

According to one characteristic of the invention, this length of the backward stroke of the trigger 15 can be selected by means of the adjustment of a stop device, generically indicated by 18 and illustrated in greater detail in FIG. 2 by way of a non-restrictive embodiment. In practice, it consists of a rotating screw 19 and a linear-motion nut 20 of which the first can be made to rotate by a knob 21 with a graduated scale 22, and the second constitutes the real stop element as such. It is clear that depending on how far out the nut 20 is, corresponding to the angular position of the knob 21, set and displayed by the graduated scale 22, the backward stroke of the trigger button 15 will be shorter or longer and, correspondingly, the rotation speed of the motor determined by the variator 17 will be higher or lower.

In an extreme or fully out position, the nut 20 blocks the trigger 15 and stops it from being pulled back, and therefore constitutes a safety device.

In accordance with another aspect of the invention, there is a selector consisting of a microswitch 23, the actuating button of which 24 protrudes into the end of the opening 16 opposite the trigger switch 15, for selecting the rotation direction of the motor and therefore for switching between the forward or reverse movement of the threaded rod 3 with the piston 13. In this way, the inversion of the rotation direction of the motor 7 can be operated in an extremely simple and immediate manner by means of the same finger the operator normally uses to actuate the trigger switch 15, simply by moving the finger forward into contact with the button 24.

The speed of inversion of the movement obtained in this way makes it possible to effectively avoid further undesired extrusion of the material from the tool 1, particularly at the end of the extrusion phase.

Naturally, the construction details and the embodiments will be able to be varied considerably with respect to what has been described and illustrated purely for illustrative and non-limiting purposes, without thereby exiting the framework of this invention as defined in the claims which follow.

What is claimed is:

1. A motorized tool for extruding semi-dense materials, such as sealants and similar substances comprising, a body in pistol form containing a threaded rod disposed in threaded engagement with a rotatable axially fixed nut, a friction clutch device operatively connected to said threaded rod for preventing said threaded rod from rotating relative to said body, a piston carried at one end of said threaded rod, a reversible electric motor operatively connected to said rotatable nut for rotating said nut in opposite directions to move said threaded rod axially in opposite directions respectively, a trigger switch slidably mounted in a handle portion of said body for actuating said motor, a selector switch carried by said body and disposed forwardly of said trigger switch for selecting a direction of rotation of said motor, said selector switch comprising a micro switch and an operating button for the micro switch adapted to be moved forwardly away from said trigger switch for switching over the direction of rotation of said motor, an electronic variator connected to said trigger switch for controlling rotational speed of said motor, which rotational speed depends on the length of a sliding stroke of said trigger switch into said handle portion and an adjustable stop device for selecting the length of the stroke of the trigger switch, said adjustable stop device including a rotating screw and a linear motion nut movable on the rotating screw behind said trigger for engagement by the trigger switch and a manually operable knob for rotating said screw wherein said linear motion nut is movable into engagement with the trigger switch in an extreme forward position to lock the trigger switch and prevent operation of the tool.

* * * * *